United States Patent
Sakane

(10) Patent No.: US 10,623,669 B2
(45) Date of Patent: Apr. 14, 2020

(54) IMAGE CAPTURING CONTROL APPARATUS, IMAGE CAPTURING APPARATUS, IMAGE CAPTURING SYSTEM AND IMAGE CAPTURING CONTROL METHOD

(71) Applicant: SONY CORPORATION, Tokyo (JP)

(72) Inventor: Seijiro Sakane, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 137 days.

(21) Appl. No.: 15/313,394

(22) PCT Filed: Mar. 30, 2015

(86) PCT No.: PCT/JP2015/001811
§ 371 (c)(1),
(2) Date: Nov. 22, 2016

(87) PCT Pub. No.: WO2015/190021
PCT Pub. Date: Dec. 17, 2015

(65) Prior Publication Data
US 2018/0234645 A1      Aug. 16, 2018

(30) Foreign Application Priority Data

Jun. 10, 2014   (JP) .................................. 2014-120014

(51) Int. Cl.
*H04N 5/341*   (2011.01)
*H04N 5/345*   (2011.01)
(Continued)

(52) U.S. Cl.
CPC ........... *H04N 5/341* (2013.01); *H04N 5/2351* (2013.01); *H04N 5/2353* (2013.01);
(Continued)

(58) Field of Classification Search
CPC ...... H04N 5/341; H04N 5/378; H04N 5/3745; H04N 5/351; H04N 5/374
See application file for complete search history.

(56) References Cited

U.S. PATENT DOCUMENTS

2007/0253694 A1   11/2007   Miyazawa et al.
2007/0253695 A1   11/2007   Miyazawa et al.
(Continued)

FOREIGN PATENT DOCUMENTS

EP       2846538 A1       3/2015
JP    2005-277513 A      10/2005
(Continued)

OTHER PUBLICATIONS

International Search Report and Written Opinion of PCT Application No. PCT/JP2015/001811, dated Jun. 2, 2015, 9 pages of English Translation and 8 pages of ISRWO.
(Continued)

*Primary Examiner* — Christopher K Peterson
(74) *Attorney, Agent, or Firm* — Chip Law Group

(57) ABSTRACT

An image capturing control apparatus includes a control unit and a plurality of image processing units. The control unit is configured to perform a read-out control of an image capturing unit such that image signals are read out in parallel, the image signals generated under different image capturing conditions for every pixel line group of a plurality of pixel lines of the image capturing unit. The plurality of image processing units are configured to process the image signals read out from the image capturing unit.

13 Claims, 10 Drawing Sheets

(51) Int. Cl.
*H04N 5/235* (2006.01)
*H04N 5/353* (2011.01)
*H04N 5/232* (2006.01)
*H04N 5/3745* (2011.01)
*H04N 5/378* (2011.01)
*H04N 5/351* (2011.01)

(52) U.S. Cl.
CPC . *H04N 5/232123* (2018.08); *H04N 5/232127* (2018.08); *H04N 5/345* (2013.01); *H04N 5/3456* (2013.01); *H04N 5/351* (2013.01); *H04N 5/3532* (2013.01); *H04N 5/378* (2013.01); *H04N 5/3745* (2013.01)

(56) References Cited

U.S. PATENT DOCUMENTS

| | | |
|---|---|---|
| 2008/0129851 A1 | 6/2008 | Kasuga et al. |
| 2015/0077590 A1 | 3/2015 | Kuriyama et al. |
| 2016/0142645 A1* | 5/2016 | Shionoya ............... H04N 5/343 348/218.1 |

FOREIGN PATENT DOCUMENTS

| | | |
|---|---|---|
| JP | 2006-245784 A | 9/2006 |
| JP | 2007-150643 A | 6/2007 |
| JP | 2007-318708 A | 12/2007 |
| JP | 2008-141610 A | 6/2008 |
| JP | 2014-23114 A | 2/2014 |
| JP | 2014-023114 A | 2/2014 |
| WO | 2013/164915 A | 7/2013 |
| WO | 2013/164915 A1 | 11/2013 |
| WO | 2015/001646 A1 | 1/2015 |

OTHER PUBLICATIONS

Office Action for JP Patent Application No. 2016-527614, dated Sep. 11, 2018, 11 pages of Office Action and 06 pages of English Translation.

Office Action for JP Patent Application No. 2016-527614, dated May 14, 2019, 07 pages of Office Action and 05 pages of English Translation.

* cited by examiner

IMAGE CAPTURING CONTROL APPARATUS, IMAGE CAPTURING APPARATUS, IMAGE CAPTURING SYSTEM AND IMAGE CAPTURING CONTROL METHOD

CROSS REFERENCE TO RELATED APPLICATIONS

This application is a U.S. National Phase of International Patent Application No. PCT/JP2015/001811 filed on Mar. 30, 2015, which claims priority benefit of Japanese Patent Application No. JP 2014-120014 filed in the Japan Patent Office on Jun. 10, 2014. The above-referenced applications is hereby incorporated herein by reference in its entirety.

TECHNICAL FIELD

The present technology relates to an image capturing control apparatus and an image capturing control method that control an image capture by an image capturing device, and to an image capturing apparatus and an image capturing system that include the image capturing control apparatus.

BACKGROUND ART

In general, in wave detection processing of AE (Automatic Exposure) processing, AF (Automatic Focus) processing, or the like of a camera, the camera gets an optimal exposed state and a focused state by a plurality of exposures. In this manner, a plurality of exposures are performed, which takes a long time for the wave detection processing. The wave detection processing is photometric processing (for example, calculation of a brightness value) in the AE processing, or range finding processing (for example, calculation of a contrast value) in the AF processing.

An image capturing apparatus described in Patent Document 1 performs processing by separating a pixel area of a CMOS (Complementary Metal-Oxide Semiconductor) image sensor into first to eighth separation areas, and reading out image signals from the separation areas in parallel. Specifically, the image capturing apparatus reads out the image signals from analog ends, stores the image signals to the memory, and calculates an AF evaluation value simply in parallel (for example, see the specification paragraph [0028] of Patent Document 1).

In an image capturing apparatus described in Patent Document 2, there are two light sensitive areas having low sensitivity and high sensitivity for every solid state image capturing device. In this manner, upon one-time photometry (exposure), a brightness range of the signals from the light sensitive areas can be wide, and a proper exposure parameter may be acquired by one-time photometry (for example, see the specification paragraph [0004], FIGS. 2, 3 of Patent Document 2).

Patent Document 1:
Japanese Patent Application Laid-open No. 2007-281887
Patent Document 2:
Japanese Patent Application Laid-open No. 2004-56422

SUMMARY OF INVENTION

Problem to be Solved by the Invention

As described above, it is conceivable that needs for high speed or highly accurate processing relating to the image capture more and more increase in the future.

An object of the present technology is to provide an image capturing control apparatus, an image capturing device, image capturing system, and an image capturing control method that high speed or highly accurate image capture processing can be achieved.

Means for Solving the Problem

In order to achieve the above-described purpose, an image capturing control apparatus according to the present technology includes a control unit and a plurality of image processing units.

The control unit is configured to perform a read-out control of an image capturing unit such that image signals are read out in parallel, the image signals generated under different image capturing conditions for every pixel line group of a plurality of pixel lines of the image capturing unit.

The plurality of image processing units are configured to process the image signals read out from the image capturing unit.

The control unit performs a read-out control of image signals in parallel, the image signals generated under different image capturing conditions for every pixel line group, and the plurality of image processing units process the image signals. Accordingly, depending on the processing by the image processing unit, high speed or highly accurate processing can be achieved.

The control unit may be configured to perform a row thinning read-out from each pixel line group, and the plurality of image processing units may be configured to process the row thinned image read out by the row thinning read-out.

The control unit may be configured to perform a read-out control of the image signals from the image capturing unit, the image signals being generated under different exposure conditions for every pixel line group. Also, the plurality of image processing units may be configured to perform the evaluation processing in the AE (Automatic Exposure) processing.

As the evaluation processing in the AE is performed on the image signals generated under the different exposure conditions in parallel, high speed evaluation processing (photometric processing) is possible, which results in high speed AE processing.

Alternatively, in the above-described case, the plurality of image processing units may be configured to perform the evaluation processing in the AF (Automatic Focus) processing.

For example, one image processing unit performs the evaluation processing on the image set to the exposure condition suitable for the AF processing, whereby highly accurate or optimal AF processing is possible.

The control unit may be configured to perform a row thinning read-out from a first pixel line group of the plurality of pixel limes, and read out a partial image unthinned at a partial area of a whole image generated at a second pixel line group different from the first pixel line group. Also, the plurality of image processing units may be configured to process the row thinned image read out by the row thinning read-out and the partial image.

The control unit may be configured to perform a read-out control of the image signals generated under the different exposure conditions for every pixel line group, and the plurality of image processing units may be configured to perform the evaluation processing in the AE processing.

As the partial image has a resolution higher than the thinned image, a photometry accuracy within the partial image in the AE processing is increased, whereby partially highly accurate AE processing is possible.

Alternatively, in the above-described case, the plurality of image processing units may be configured to perform the evaluation processing in the AF processing.

For example, when the thinned image is used as a so-called through image displayed on the display unit, one of the plurality of image processing units can perform the evaluation processing of the AF processing on the partial image not displayed on the display unit generated under the exposure condition suitable for the AF. As a result, highly accurate or optimal AF processing is possible.

The control unit may be configured to perform the read-out control such that the image signals are read out at a predetermined read-out cycle, and a parallel read-out timing is shifted by a time shorter than the read-out cycle (for example, ½ period). Also, the plurality of image processing units may be configured to perform the evaluation processing in the AF processing.

In this manner, as the plurality of image processing units can perform the processing in a time shorter than the read-out cycle (for example, ½ period) for the whole image processing unit, high speed AF processing can be achieved.

The control unit may be configured to read out the image signals in parallel via a plurality of output paths connected to the image processing units.

Other image capturing control apparatus according to the present technology includes a control unit and a plurality of image processing units.

The control unit is configured to read out image signals generated for every pixel line group of a plurality of pixel lines of an image capturing unit at a predetermined read-out cycle, and to perform the read-out control such that a parallel read-out timing is shifted by a time shorter than the read-out cycle (for example, ½ period).

The plurality of image processing units are configured to process the image signals read out from the image capturing unit.

As the plurality of image processing units can perform the processing in a time shorter than the read-out cycle (for example, ½ period), high speed processing can be achieved.

The plurality of image processing units may be configured to perform the evaluation processing in the AF (Automatic Focus) processing, whereby high speed AF processing can be achieved.

An image capturing apparatus according to the present technology includes an image capturing unit, a plurality of output paths, a control unit, and a plurality of image processing units.

The image capturing unit includes a plurality of pixel lines.

The plurality of output paths are configured to be capable of connecting to the image capturing units for every pixel line group of the plurality of pixel lines.

The control unit is configured to set different image capturing conditions for every pixel line group, and is configured to perform a read-out control of the image capturing unit such that the image signals generated at the pixel line groups under the different image capturing conditions are read out via the plurality of output paths.

The plurality of image processing units are configured to process the image signals read out from the image capturing unit.

An image capturing system according to the present technology includes the image capturing unit, the plurality of output paths, the control unit, and the plurality of image processing units of the above-described image capturing apparatus.

An image capturing control method according to the present technology includes performing a read-out control of the image capturing unit such that image signals are read out in parallel, the image signals generated under different image capturing conditions for every pixel line group of a plurality of pixel lines of the image capturing unit.

The image signals read out from the image capturing unit are processed.

Effects of the Invention

As described above, according to the present technology, high speed or highly accurate processing relating to image capture can be achieved.

It should be noted that the effect described here is not necessarily limitative and may be any effect described in the present disclosure.

MODES FOR CARRYING OUT THE INVENTION

Hereinafter, an embodiment of the present technology will be described with reference to the drawings.

1. Configuration Example 1 of Image Capturing Apparatus

Figure 1:
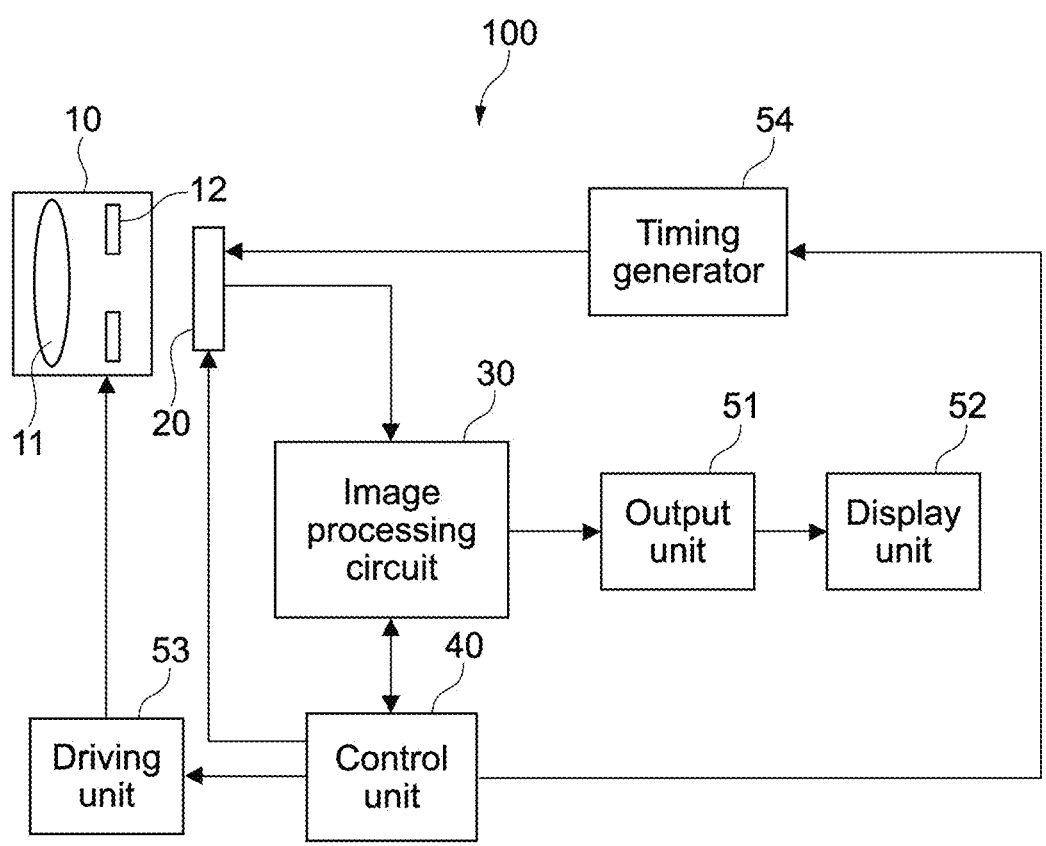
FIG. 1 is a block diagram showing a configuration of an image capturing apparatus according to an embodiment of the present technology.

FIG. 1 is a block diagram showing a configuration of an image capturing apparatus according to an embodiment of the present technology.

An image capturing apparatus 100 mainly includes an optical component 10, a solid state image capturing device 20, an image processing circuit 30, an output unit 51, a display unit 52, a driving unit 53, a timing generator 54, and a control unit 40.

The optical component 10 includes a lens 11, a diaphragm 12 etc., and may also include an optical filter (not shown) etc. Light from a subject to be imaged is incident on the solid state image capturing device 20 via the optical component 10.

The solid state image capturing device 20 functions as an "image capturing unit", and is an image sensor such as CMOS (Complementary Metal-Oxide Semiconductor), for example. In this case, it may or may not be a lamination type where a pixel array and a drive circuit are laminated.

The image processing circuit 30 fetches the image signals output from the solid state image capturing device 20, and performs a predetermined image processing. The image processing circuit 30 according to the embodiment is a parallel processing circuit, as described later. For example, two image processing units perform image processing in parallel.

The output unit 51 performs conversion processing necessary for outputting digital signals acquired via the image processing circuit 30 to the display unit 52. The display unit 52 displays an image processed at the output unit 51. The display unit 52 according to the embodiment mainly displays a so-called through image, i.e., displays a thinned image as it is read by thinning at the image processing circuit 30, as described later.

The driving unit 53 drives the lens 11 in order to perform AF (Automatic Focus) processing, for example, by the control unit 40 based on an instruction from the control unit 40. The driving unit 53 may drive the diaphragm 12 for further AE (Automatic Exposure) processing based on the instruction of the control unit 40.

Figure 2:
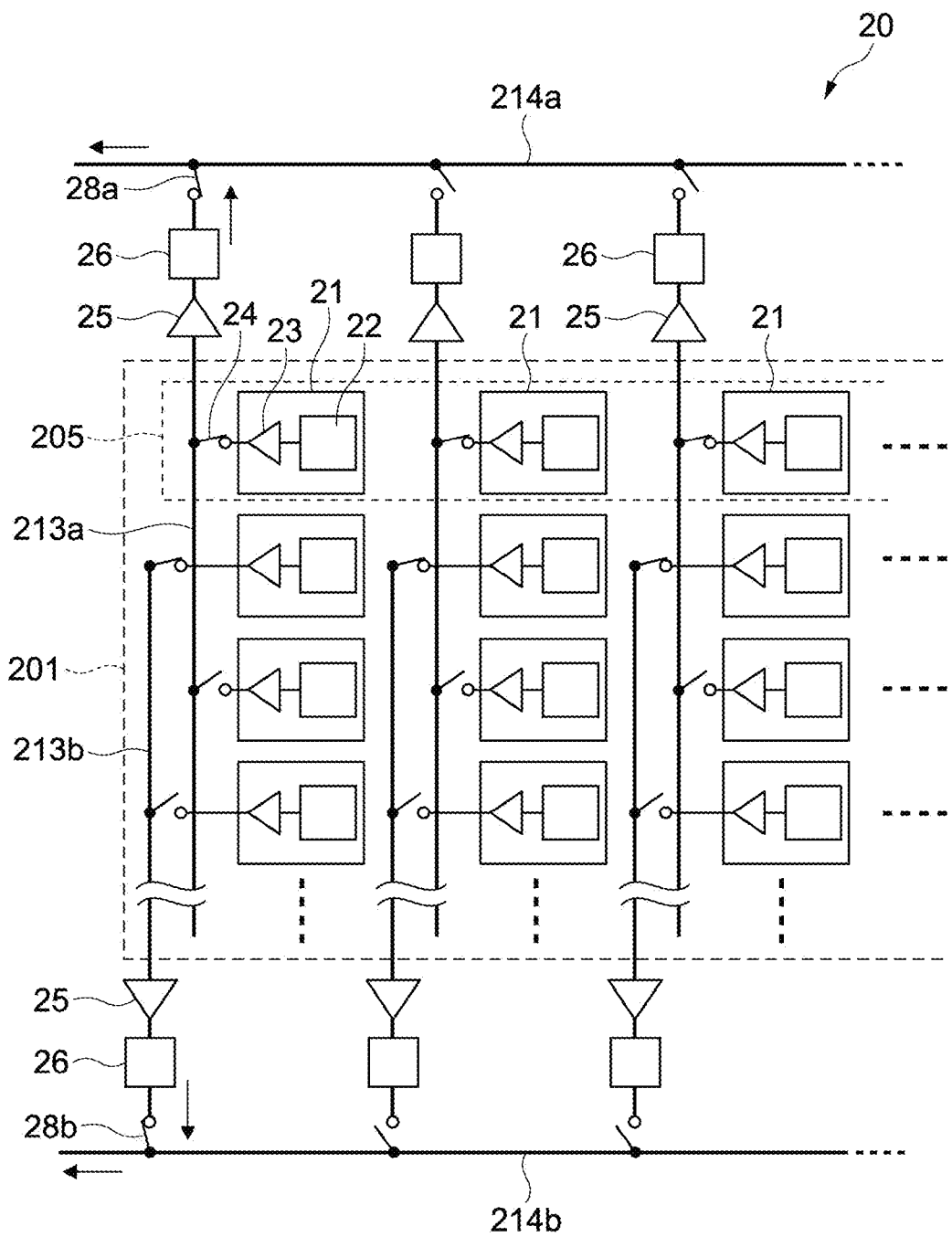
FIG. 2 shows a configuration example of a solid state image capturing device, which is a CMOS image sensor, for example.

FIG. 2 shows a configuration example of the solid state image capturing device 20, which is a CMOS image sensor, for example.

The timing generator 54 (see FIG. 1) generates driving synchronization signals of the solid state image capturing device 20 based on the instruction from the control unit 40. Also, the control unit 40 performs setting of a resistor value through serial communication for resistor groups that determine internal operations and are present at inside of the solid state image capturing device 20.

The solid state image capturing device 20 generates a pulse necessary for fetching charges accumulated at the photodiodes 22 inside of the solid state image capturing device 20 based on the driving synchronization signals from the timing generator 54 and resistor setting from the control unit 40. For example, ON/OFF of pixel selection switches 24 for vertical transfer disposed at each pixel 21 is controlled for each pixel line (i.e., row) 205. Also, ON/OFF of column selection switches 28a, 28b for horizontal transfer for selecting vertical signal lines 213a, 213b is controlled.

Accordingly, an electronic shutter speed, i.e., an exposure time of each pixel, for performing the AE processing based on a resistor setting from the control unit 40.

Referring to FIG. 1, the control unit 40 mainly has a CPU (Central Processing Unit) and a memory (not shown). The control unit 40 controls an operation of each of the solid state image capturing device 20, the image processing circuit 30, the output unit 51, the driving unit 53 and the timing generator 54.

At least the control unit 40 and the image processing circuit 30 (mainly each image processing unit thereof) function as an "image capturing control apparatus".

The image capturing apparatus 100 may include an operation unit to which an operation is input by a user, an external terminal for outputting the image processed at the image processing circuit 30, etc. other than the above-described components.

Figure 3:
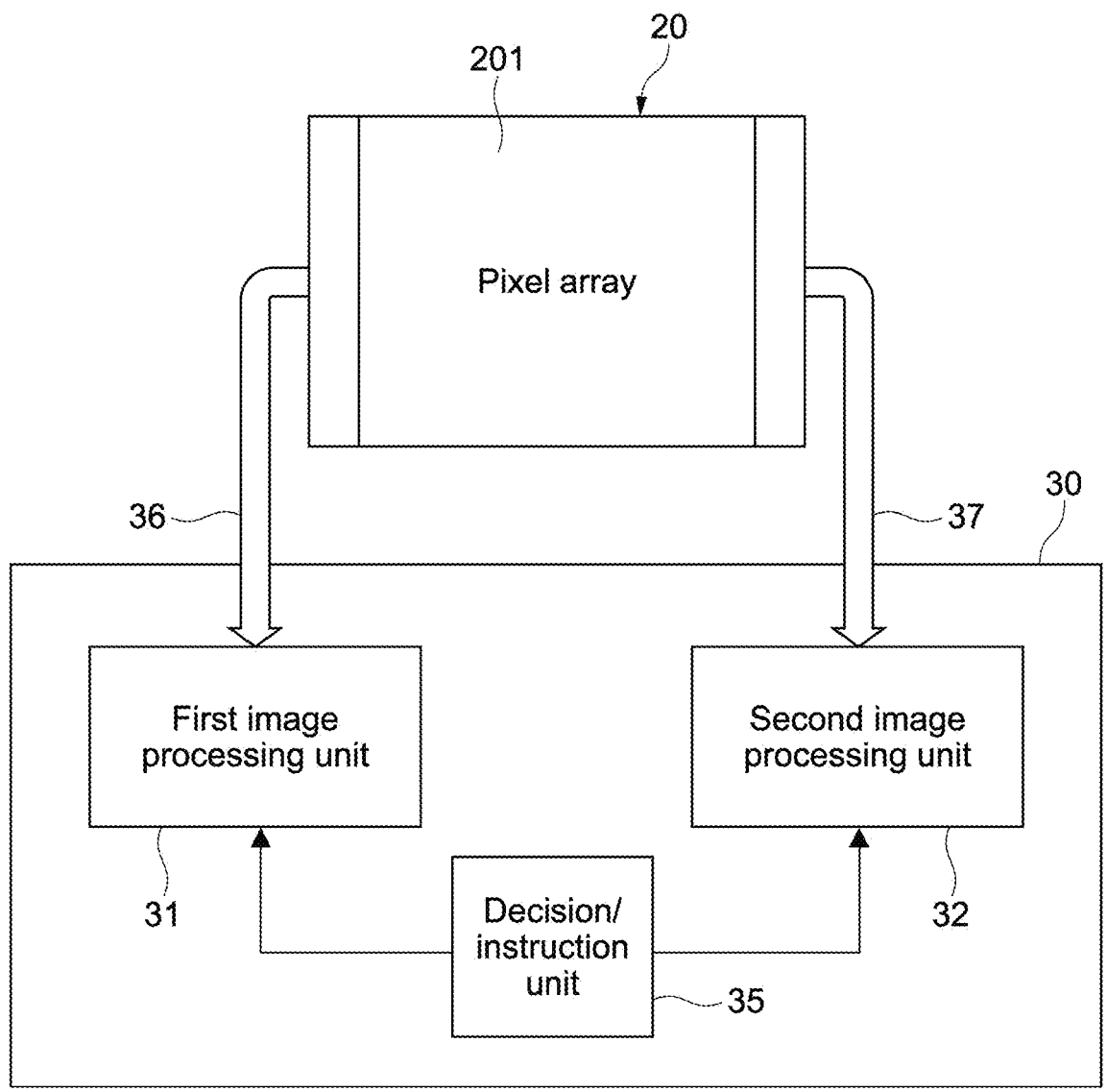
FIG. 3 is a block diagram showing mainly a configuration of an image processing circuit.

FIG. 3 is a block diagram showing mainly a configuration of the image processing circuit 30. The image processing circuit 30 includes a plurality of image processing units 31, 32 that are configured to be capable of parallel processing. For convenience of description, there are two image processing units that are referred to as a first image processing unit 31 and a second image processing unit 32. The image processing circuit 30 includes a decision/instruction unit 35 that sends an instruction of processing, depending on a processing status of one of the first image processing unit 31 and the second image processing unit 32, to the other, and makes a decision. The operation of the decision/instruction unit 35 is controlled by the control unit 40.

The decision/instruction unit 35 may be a component built in the control unit.

To the solid state image capturing device 20, a plurality of output paths 36, 37 for outputting the image signals are connected. For convenience of description, there are two output paths that are referred to as a first output path 36 and a second output path 37. The image signals generated at the solid state image capturing device 20 are input to the first image processing unit 31 via the first output path 36, and to the second image processing unit 32 via the second output path 37.

As shown in FIG. 2, a pixel array 201 of the solid state image capturing device 20 has the above-described plurality of pixel lines 205 that are arranged in a vertical direction. One pixel line 205 is configured of a plurality of pixels 21 arranged in a horizontal direction. Each pixel 21 has the photodiode 22 and an amplifier 23.

The first output path 36 is configured to be capable of connecting to a pixel line group in an odd number of 1, 3, 5, . . . , 2n−1, for example, by the pixel selection switch 24. For convenience of description, the pixel line group in the odd number is referred to as a pixel line group A. On the other hand, the second output path 37 is configured to be capable of connecting to a pixel line group in an even number of 2, 4, 6, . . . , 2n, by the pixel selection switch 24. For convenience of description, the pixel line group in the even number is referred to as a pixel line group B.

It is not limited to the embodiment that the first pixel line group A is the pixel line in the odd number, the second pixel line group B is the pixel line in the even line, and the respective lines of the pixel line groups A, B are arranged on alternate lines. For example, the lines of the pixel line group A and the lines of the pixel line group B may be arranged for every predetermined lines, e.g., for every two lines, for every several lines or the like.

The solid state image capturing device 20 includes a CDS (Correlated Double Sampling) circuit 25 and an ADC (Analog to Digital Converter) 26 for every line, e.g., for every vertical signal line 213a and vertical signal line 213b. The ADC 26 includes a PGC (Programmable Gain Control) circuit inside, and can control a gain based on the resistor setting from the control unit 40. Noises of the pixel signals are removed by the CDS circuit 25, and analog signals are converted into digital signals by the ADC 26. The respective vertical signal lines 213a, 213b are configured to be capable of connecting to the horizontal signal lines 214a, 214b via the column selection switches 28a, 28b, respectively.

The horizontal signal line 214a is connected to the first output path 36, for example. The horizontal signal line 214b is connected to the second output path 37, for example.

2. Each Processing Embodiment by Image Capturing Control Apparatus

Next, each processing embodiment mainly by the image processing circuit 30 of the image capturing apparatus 100 configured as described above will be described.

1) First Embodiment

Figure 4:
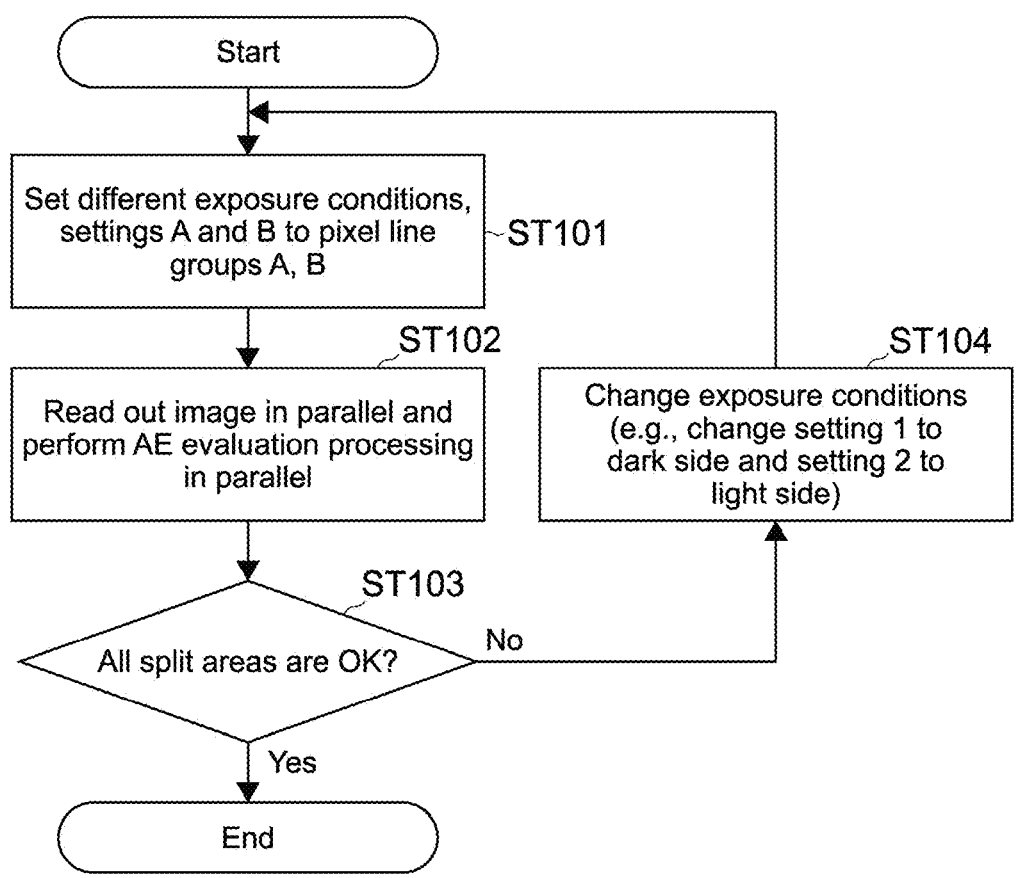
FIG. 4 is a flow chart showing processing according to a first embodiment.

FIG. 4 is a flow chart showing the AE processing by the control unit 40 and the image processing circuit 30.

The control unit 40 sets image capturing conditions, i.e., exposure conditions being different in the pixel line group A and the pixel line group B (Step 101). The exposure conditions are set by at least one of the above-described electronic shutter speed and the gain by the ADC 26. For convenience of description, the exposure condition set for the pixel line group A is referred to as a setting A, and the exposure condition set for the pixel line group B is referred to as a setting B.

The setting A is such that an initial exposure amount is lowest, and the setting B is such that an initial exposure amount is highest, and vice versa.

Next, the control unit 40 reads out the pixel signals from the pixel line group A and the pixel line group B in parallel via the first output path 36 and the second output path 37 (Step 102). In other words, a read-out timing of the pixel signals from the pixel line group A under the exposure condition of the setting A and a read-out timing of the pixel signals from the pixel line group B under the exposure condition of the setting B are simultaneous.

In the first embodiment, each image processing unit thins at a predetermined thinning rate (described later), and reads out the image signal. In other words, a row thinning read-out is performed. For example, the pixel signals of the pixel line 205 having a line number lower than that of the pixel line group A are read out to the first image processing unit 31. The pixel signals of the pixel line 205 having a line number lower than that of the pixel line group B are read out to the second image processing unit 32.

The thinning rate may be set to 3, 5, 7, or more, for example. When the thinning rate is 5, the image signals are read out from one pixel line 205 for every five lines of odd number lines or even number lines. The thinning rate may be same or different in the first image processing unit 31 and the second image processing unit 32.

Note that the image generated in the line number same as the pixel line number of the pixel line group A (or B) is ½ in size of the image generated in the whole pixel array 201, but is not applicable to the thinned image to which the present application refers.

The decision/instruction unit 35 performs evaluation processing in the AE in the first image processing unit 31 and the second image processing unit 32 in parallel and independently (Step 102). The evaluation processing includes photometric processing by any photometry method such as a split photometry method, a center-weighted photometry method, an average photometry method, and a specific section photometry method. The image capturing apparatus 100 may include a program that one of these methods can be selected by a user's operation.

Figure 5:
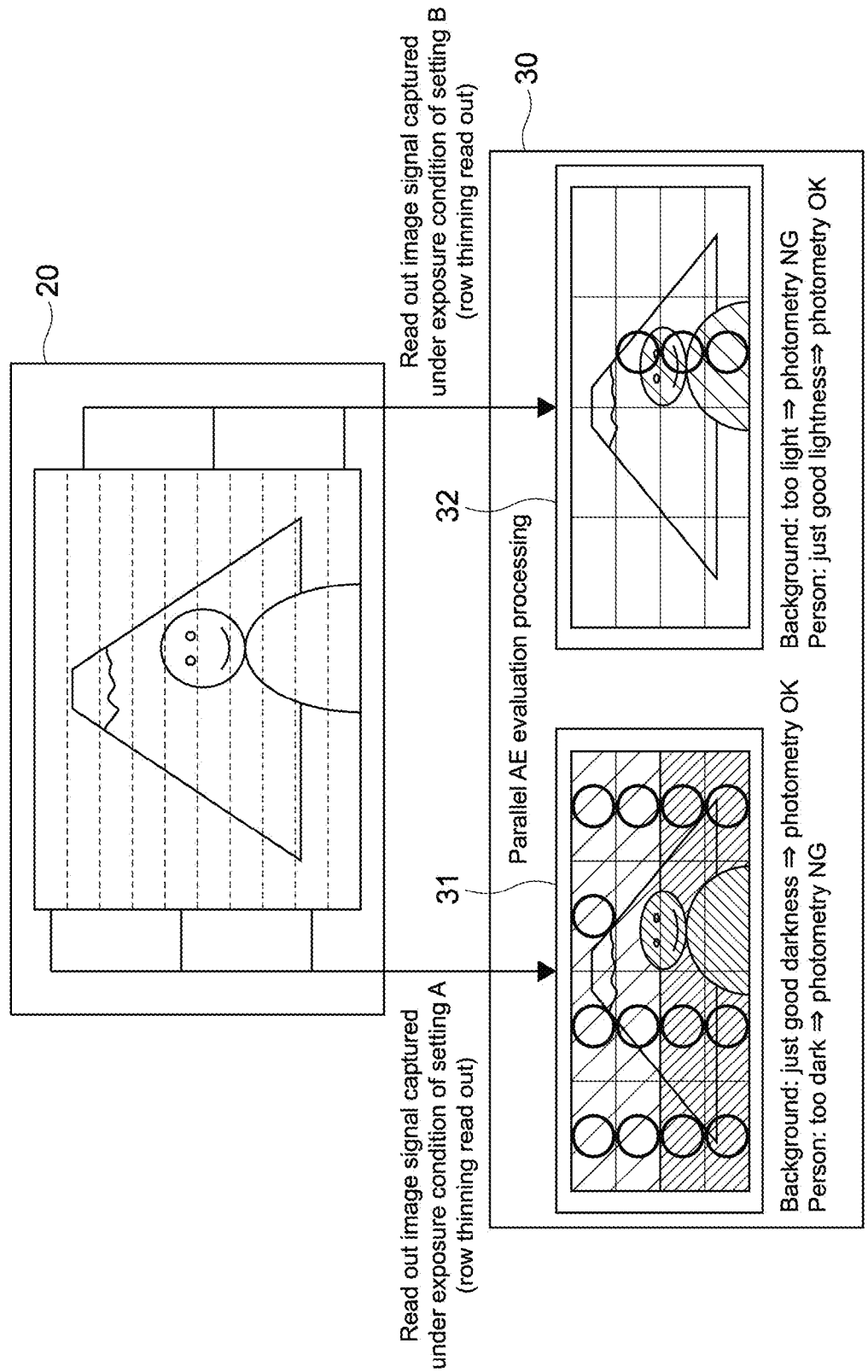
FIG. 5 shows image examples for illustrating the first embodiment.

For example, as shown FIG. 5, it illustrates that a person is image-captured using mountain and sky as a background. The first image processing unit 31 and the second image processing unit 32 perform photometric processing using the split photometry method where one frame image is split into 4×4. In the figure, at a first image processing unit 31 side, when an exposure amount (brightness) at each circle area exceeds a threshold value, e.g., reference standard, it passes (OK). At a second image processing unit 32 side, when the brightness at each circle is lower than the reference standard, e.g., threshold value, it is OK. In this way, each image processing unit 31, 32 generates an evaluation value that shows OK or NG as a result of the photometric processing for the area.

Note that the threshold value may be same or different in the first image processing unit 31 and the second image processing unit 32. The threshold value may have a range (width). In this case, the evaluation value is created whether or not the brightness of the subject to be measured is within the predetermined range.

In the first image processing unit 31, the brightness around the person image area is lower than the threshold value and is NG, and the brightness of other areas exceeds the threshold value and is OK. On the other hand, in the second image processing unit 32, the brightness around the person image area is lower than the threshold value and is OK, and the brightness of other areas exceeds the threshold value and is NG.

When the decision/instruction unit 35 determines that there is at least one NG in the evaluation values of all split areas (No in Step 103), the information is sent to the control unit 40. In this case, the control unit 40 sets the setting A to the exposure amount one step higher than the above-described initial setting, and sets the setting B to the exposure amount one step lower than the above-described initial setting (Step 104). Then, the image processing circuit 30 performs Steps 102, 103 in this order.

In a loop processing in Steps 102 to 104, the threshold value for creating the evaluation value may be changed for every loop.

In Step 102 in a 2nd loop, the decision/instruction unit 35 may perform photometry only for the split areas that are NG by both of the first image processing unit 31 and the second image processing unit 32 in the former (1st loop) Step 102. Alternatively, each image processing unit may create again the evaluation values of all split areas regardless of an evaluation result at each image processing unit in the former Step 102.

In Step 103, when the evaluation values of all split areas are OK, the control unit 40 ends the AE processing.

In the AE processing, the control unit 40 may control a diaphragm value of the diaphragm 12 by the driving unit 53 in addition to the control of the electronic shutter and/or the gain.

As described above, the control unit 40 performs a parallel read-out control of the image signals generated under the exposure conditions being different for every pixel line group A and pixel line group B, and the first image processing unit 31 and the second image processing unit 32 process the image signals in parallel. Specifically, the evaluation processing of the AE in the first image processing unit 31 and the second image processing unit 32 is performed in parallel at high speed, whereby high speed AE processing can be achieved.

In the first embodiment, the control unit 40 can display the image processed by any one of the first image processing unit 31 and the second image processing unit 32 on the display unit 52 as the through image.

2) Second Embodiment

Figure 6:
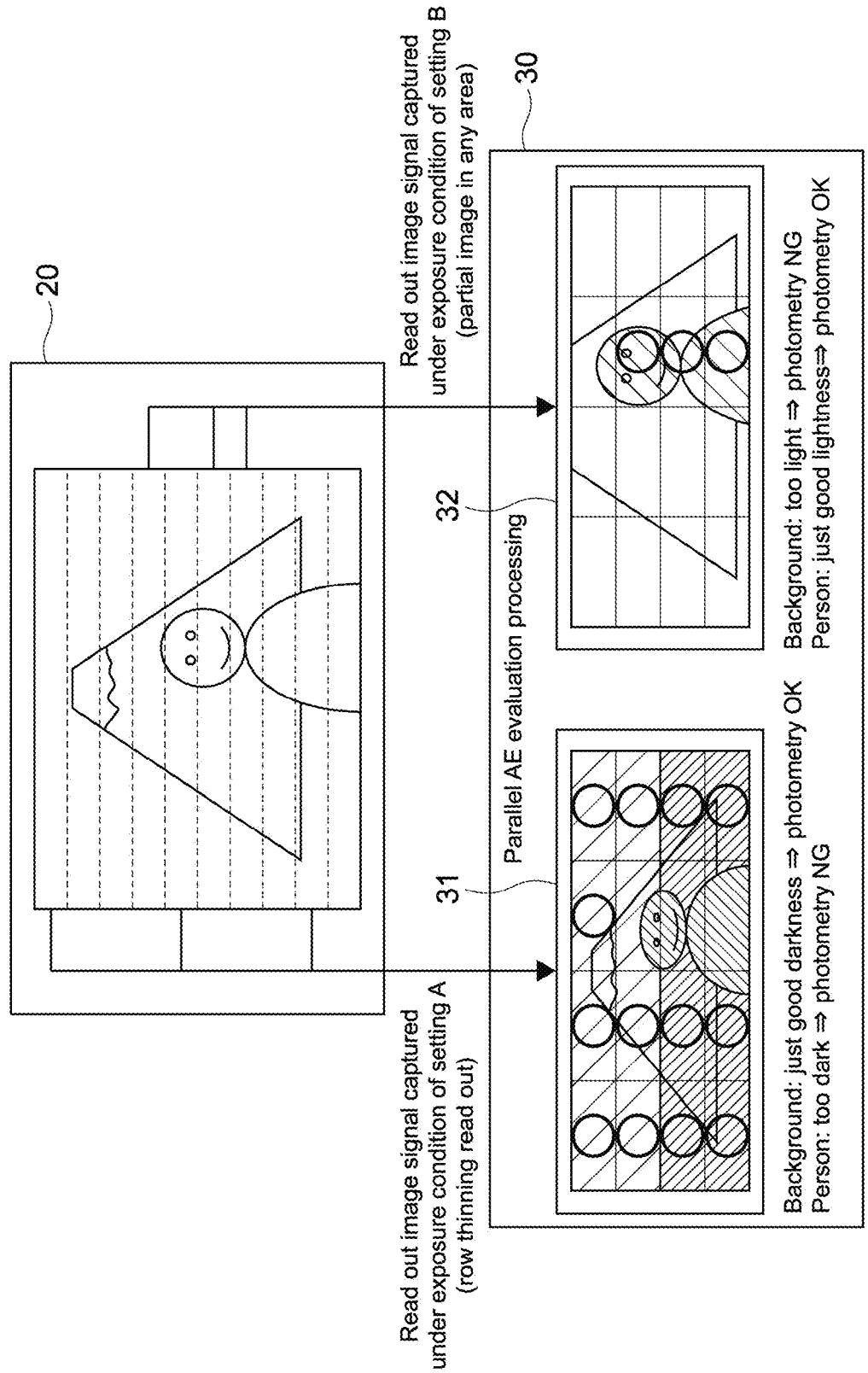
FIG. 6 shows image examples for illustrating a second embodiment.

FIG. 6 is a view for describing other processing example of the AE processing by the control unit 40 and the image processing unit as the second embodiment. Here, points different from the first embodiment will be mainly described, and the similar matters are omitted or described in a simplified way.

In the second embodiment, the control unit 40 performs the row thinning read-out from the predetermined pixel line group (first pixel line group) of the pixel line group A via the first output path 36 similar to the first embodiment.

On the other hand, the control unit 40 reads out a partial image unthinned at a partial area (partial pixel line) of a whole image generated at the pixel line group B via the second output path 37.

The partial image is at the following areas of the whole image generated at the pixel line group B. The areas are, for example, a center area, an upper end area, a lower end area, any area set by the user, or an area dynamically set (not statistically as above) by the control unit 40 according to a predetermined algorithm. The area dynamically set by the control unit 40 includes a subject image detected by an algorithm for detecting a specific subject, e.g., a face, a car license number plate, or the like.

The pixel line number of generating the partial image is typically determined according to the thinning rate at the first image processing unit 31. For example, the pixel line number is such that the size of the partial image is ⅕ of the whole image generated at the pixel line group B when the thinning rate at the first image processing unit 31 is 5.

In the example shown in FIG. 6, the partial image read-out to the second image processing unit 32 is at the area including the face of the human detected by the algorithm for detecting a face. Note that, in this case, a one frame is delayed by the face detection processing in the second image processing unit 32 as compared to the processing by the first image processing unit 31.

The evaluation processing in the AE at each image processing unit is basically same as in the first embodiment. For example, the evaluation value is created by the split photometry method (see FIG. 4).

In the second embodiment, as the partial image processed at the second image processing unit 32 is an unthinned high resolution image, a photometry accuracy within the partial image in the AE processing can be increased. As a result, partially highly accurate AE processing is possible.

In the second embodiment, the control unit 40 can display the thinned image output from the first image processing unit 31 on the display unit 52 as the through image.

3) Third Embodiment

Figure 7:
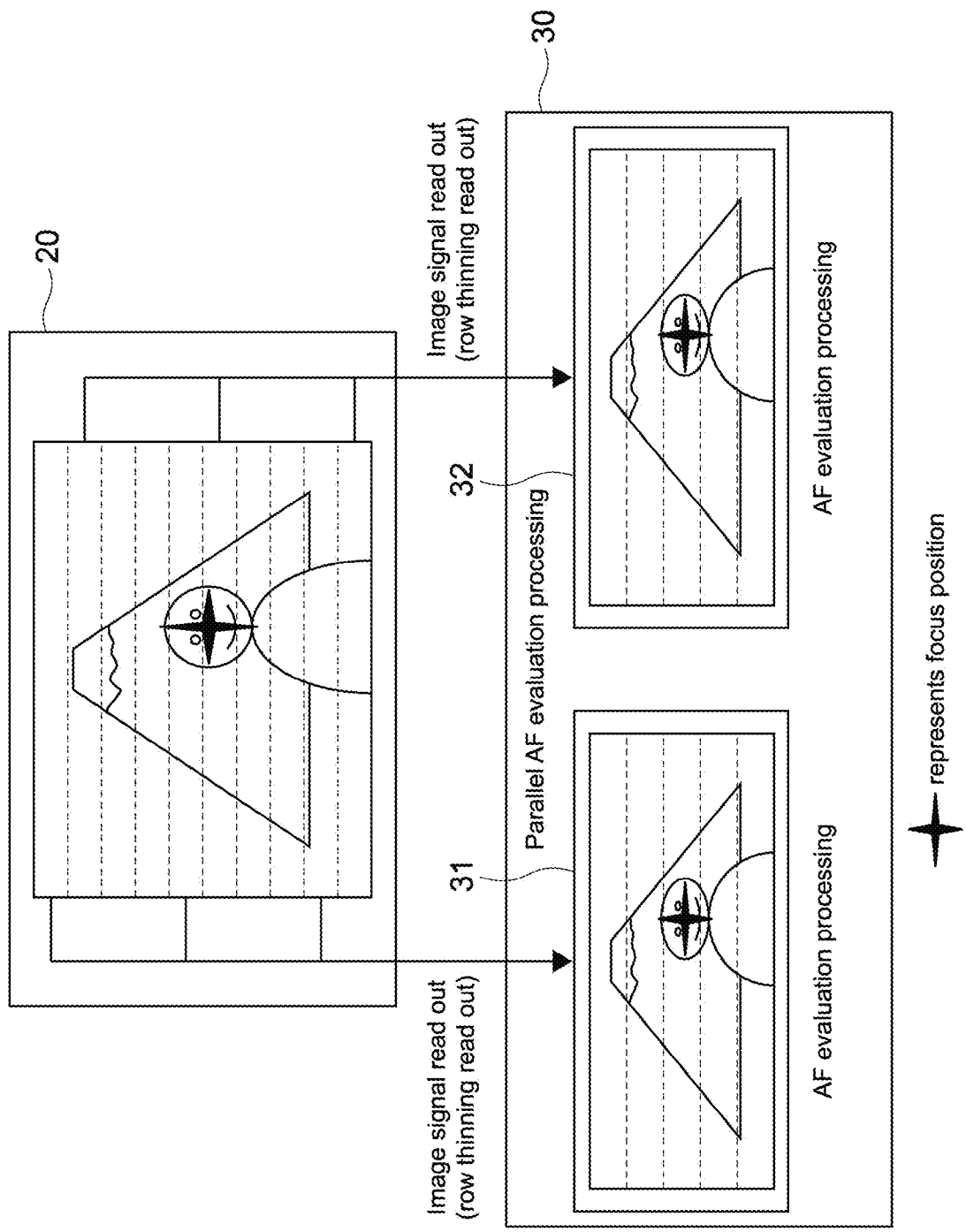
FIG. 7 shows image examples for illustrating a third embodiment.

Next, an example of the AF processing mainly by the image processing circuit 30 in the image capturing apparatus 100 will be described. FIG. 7 is a diagram for describing the AF processing.

In the third embodiment, in the control unit 40, the image read-out from the pixel line group A to the first image processing unit 31 via the first output path 36, and the image read-out from the pixel line group B to the second image processing unit 32 via the second output path 37 are thinned as in the first embodiment.

In the third embodiment, the setting A of the exposure condition at the pixel line group A and the setting B of the exposure condition at the pixel line group B may be same or different. The case when they are different will be described in sixth embodiment later.

In the third embodiment, the control unit 40 and the image processing circuit 30 perform the AF processing (for example, contrast AF processing). In the AF processing, the control unit 40 sends an instruction to the driving unit 53, and moves an optical component 10 to a predetermined direction, for example. By the movement of the optical component 10, the solid state image capturing device 20 outputs an image frame having different focuses.

Figure 8:
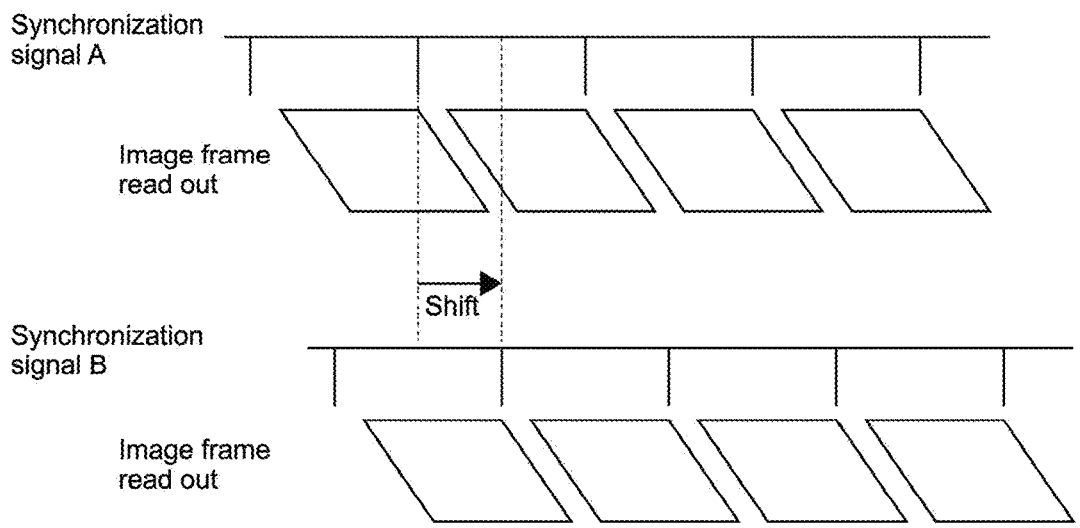
FIG. 8 is a timing chart for every image frame read in the third embodiment.

FIG. 8 is a timing chart for every image frame read based on an instruction of the control unit 40. As shown in the figure, a read-out cycle of the image frame to the first image processing unit 31 synchronizes with a synchronization signal A generated from the timing generator 54. A read-out cycle of the image frame to the second image processing unit 32 synchronizes with a synchronization signal B. The synchronization signal B is generated within the solid state image capturing device 20 based on the synchronization signal A, for example. The cycles of the synchronization signals A and B are the same, but generation timings of the synchronization signals are shifted each other within a period shorter than the cycle. Typically, they are shifted by a ½ period.

That is to way, the control unit 40 performs the read-out control to shift by a time shorter than a read-out cycle (for example, ½ period) between the two output paths 36, 37.

The shift of the read-out cycle between the two output paths 36, 37 may not be the ½ period, but also be ⅓ or ¼. For example, when an output path number is n, the shift of the read-out period among output paths may be 1/n.

Figure 9:
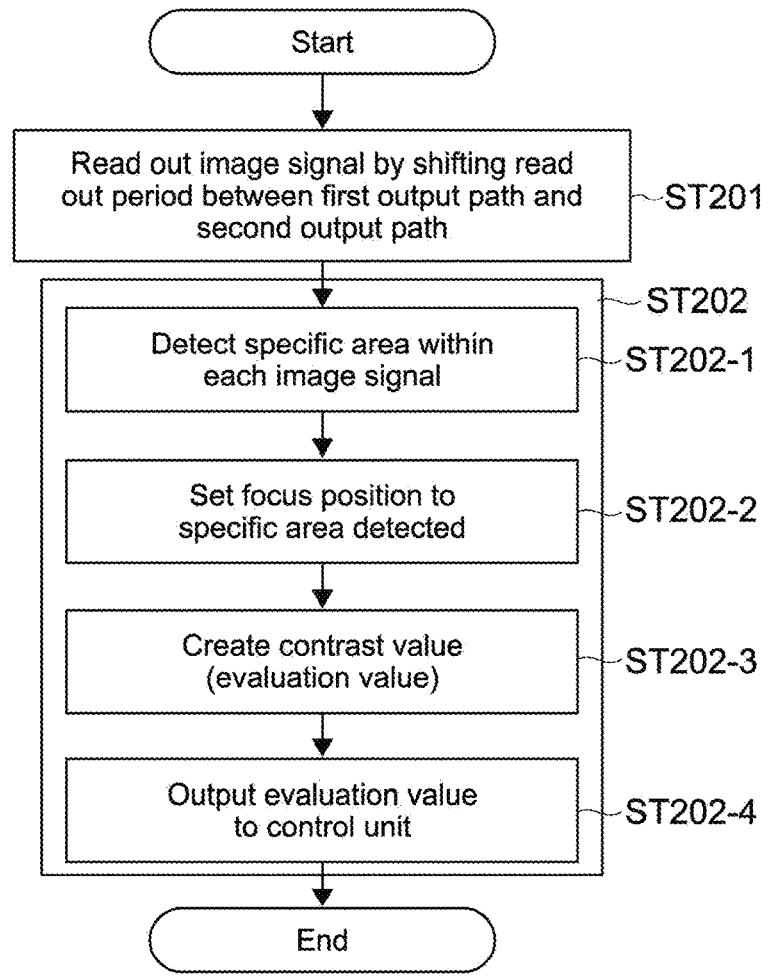
FIG. 9 is a flow chart showing processing in the third embodiment.

FIG. 9 is a flow chart showing operation by the control unit 40 and the image processing circuit 30 in the third embodiment.

As described above, the control unit 40 reads out each image signal by shifting the read-out period between the two output paths 36, 37 (Step 201). As described above, the first image processing unit 31 and the second image processing unit 32 acquire sequentially the image frames having different focuses output from the solid state image capturing device 20 based on the synchronization signals sent from the control unit 40.

The image processing circuit 30 performs the evaluation processing in the contrast AF processing (Step 202). In Step 202, the second image processing unit 32 performs the following Steps 202-1, 202-2, 202-3, 202-4 by delaying the ½ period from the processing by the first image processing unit 31.

The both image processing units 31, 32 detect, for example, a specific area within the image (Step 202-1). Here, the above-described face detection processing is performed, and a focus position is set to the area including the face (Step 202-2). It should be appreciated that it is not limited to the face detection, and the focus position may be set to the area statically or dynamically set as described in the second embodiment. The image processing units 31, 32 calculate a contrast value (evaluation value) of brightness within the predetermined area including the focus position set (Step 202-3), and output the evaluation value to the control unit 40 (Step 203-4).

A variety of known algorithms for calculating the contrast value may be applicable.

The control unit 40 controls driving of the optical component 10 such that the evaluation value provided from the decision/instruction unit 35 is greatest.

As described above, the control unit 40 performs the read-out control so as to shift the two output paths by the ½ period, frame rates of the read-out and the evaluation processing become twice of those by the one image processing unit. As a result, the speed of the evaluation processing within the image processing circuit 30 becomes twice of the speed of the evaluation processing by the one image processing unit. Thus, high speed AF processing can be achieved.

Note that also in the third embodiment, the thinning rates of the pixel signals of the pixel line groups A, B may be same or different.

4) Fourth Embodiment

Figure 10:
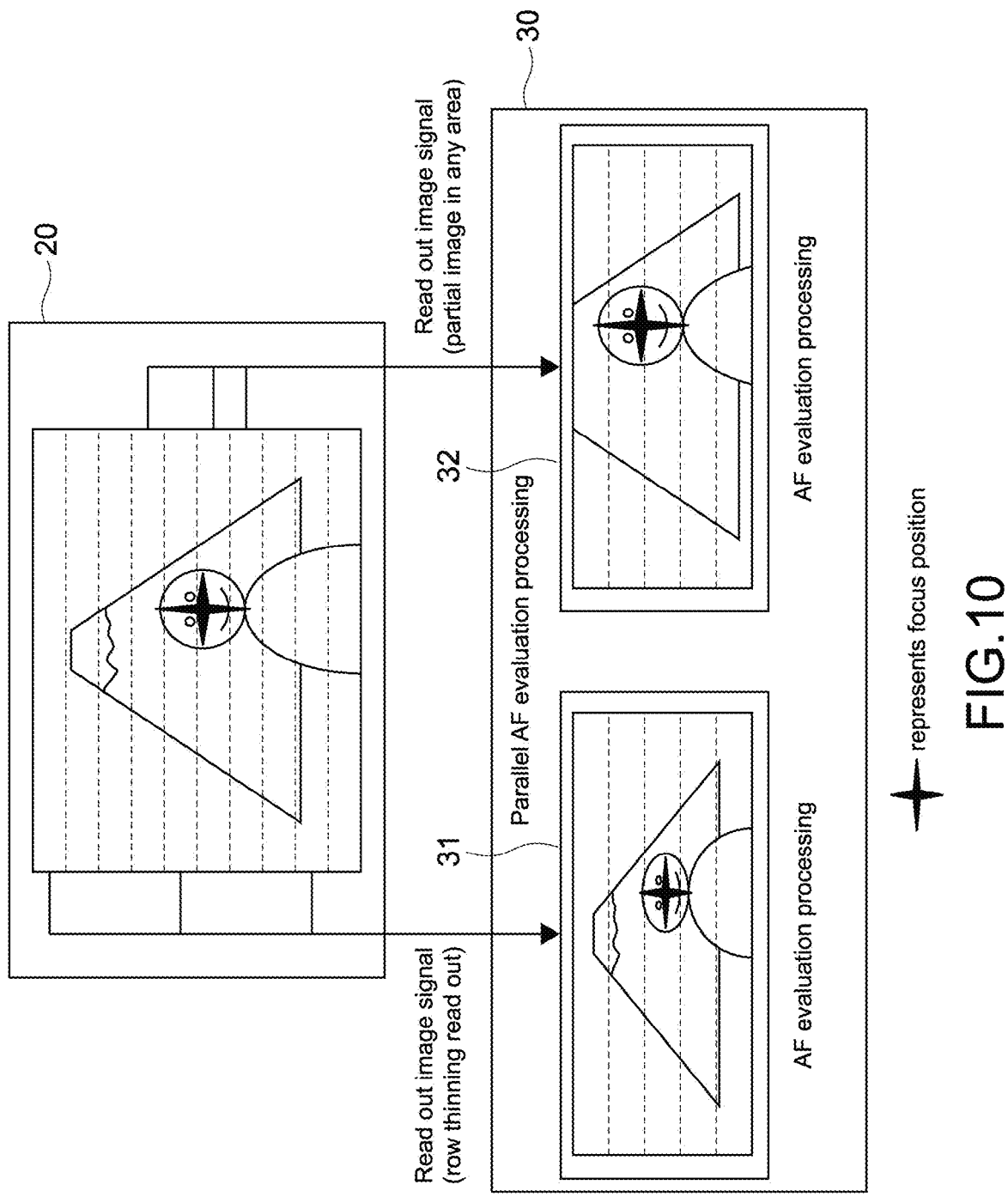
FIG. 10 shows image examples for illustrating a fourth embodiment.

FIG. 10 is a view for illustrating other processing example of the AF processing by the control unit 40 and the image processing circuit 30 as a fourth embodiment. Here, points different from the third embodiment will be mainly described, and the similar matters are omitted or described in a simplified way.

In the fourth embodiment, the control unit 40 performs the row thinning read-out via the first output path 36. Also, the control unit 40 reads out the unthinned images, i.e., the partial images of the whole image generated in the pixel line group B, in parallel (depending on the synchronization signals received at the same timing) via the second output path 37. In other words, it is similar to the second embodiment.

In the fourth embodiment, the setting A of the exposure condition at the pixel line group A and the setting B of the exposure condition at the pixel line group B may be same or different.

The image processing circuit 30 performs the evaluation processing for the AF processing similar to Step 202 in FIG. 9. Dissimilar to the third embodiment, in the fourth embodiment, the first image processing unit 31 and the second image processing unit 32 perform the processing according to the synchronization signals received in the same timing.

In the fourth embodiment, the partial image processed at the second image processing unit 32 is the unthinned high resolution image. Accordingly, in the AF processing, an evaluation accuracy within the partial image can be increased. As a result, partially highly accurate AE processing is possible.

5) Fifth Embodiment

As the processing according to a fifth embodiment, the fourth embodiment may be combined with the third embodiment. Specifically, the control unit 40 reads out the row thinned image via the first output path 36, and reads out the partial image via the second output path 37 by shifting the read-out cycle as in the third embodiment. Then, the image processing circuit 30 performs processing to the row thinned image and the partial image by shifting the timing as in the third embodiment. In this way, partially highly accurate and high speed AE processing is possible.

6) Sixth Embodiment

As processing according to a sixth embodiment, the image capturing control apparatus may perform the photometric processing (evaluation processing in the AE processing) before the AF processing in the above-described fourth embodiment, for example.

In the AF processing, as shown in the fourth embodiment, the control unit 40 reads out the thinned image via the first output path 36, and reads out the partial image via the second output path 37. When brightness (e.g., average value or representative value measured by the split photometry) of the thinned image and the partial image is not more than the threshold value, in other words, when the brightness in the both images is almost same, the setting A and the setting B under the above-described exposure conditions are the same.

However, when angles of view (image ranges) of the thinned image and the partial image upon the thinning reading out are different, the brightness is expected to be different in each. For example, as described in the second embodiment of FIG. 5, a mountain top is imaged as the background in the thinned image, and the mountain top may be very bright, for example. In this case, there may be a difference between a result of the photometric processing of the thinned image and a result of the photometric processing of the partial image where no mountain top is imaged. Accordingly, in order to perform the AF processing in an optimal exposed state, it is desirable that the settings A and B of the exposure conditions are different.

Accordingly, in this case, the image capturing control apparatus performs the photometric processing in the different settings A and B of the exposure conditions as in the second embodiment, and performs the AF processing of the fourth or fifth embodiment in the settings A and B of the exposure condition. In this way, high speed/highly accurate AE processing is possible in the optimal exposure condition.

7) Seventh Embodiment

A seventh embodiment illustrates the photometric processing (evaluation processing in the AE processing) before the AF processing as in the above-described sixth embodiment.

For example, first image processing unit 31 performs the evaluation processing for the AF processing, and outputs the thinned image as the through image to the display unit 52 via the output unit 51. On the other hand, the second image processing unit 32 performs the evaluation processing for the highly accurate AF processing by acquiring the partial image and not displaying the partial image on the display unit 52 (in background) as in the fourth embodiment.

Here, when it is supposed to capture an image at dark, the through image is too dark to preform the AF processing. However, as the partial image is not output as the through image, the control unit 40 can set the setting B so as to increase the exposure amount suitable for the AF processing. It is thus possible to perform highly accurate AF processing.

2. Configuration Example 2 of Image Capturing Apparatus

Figure 11:
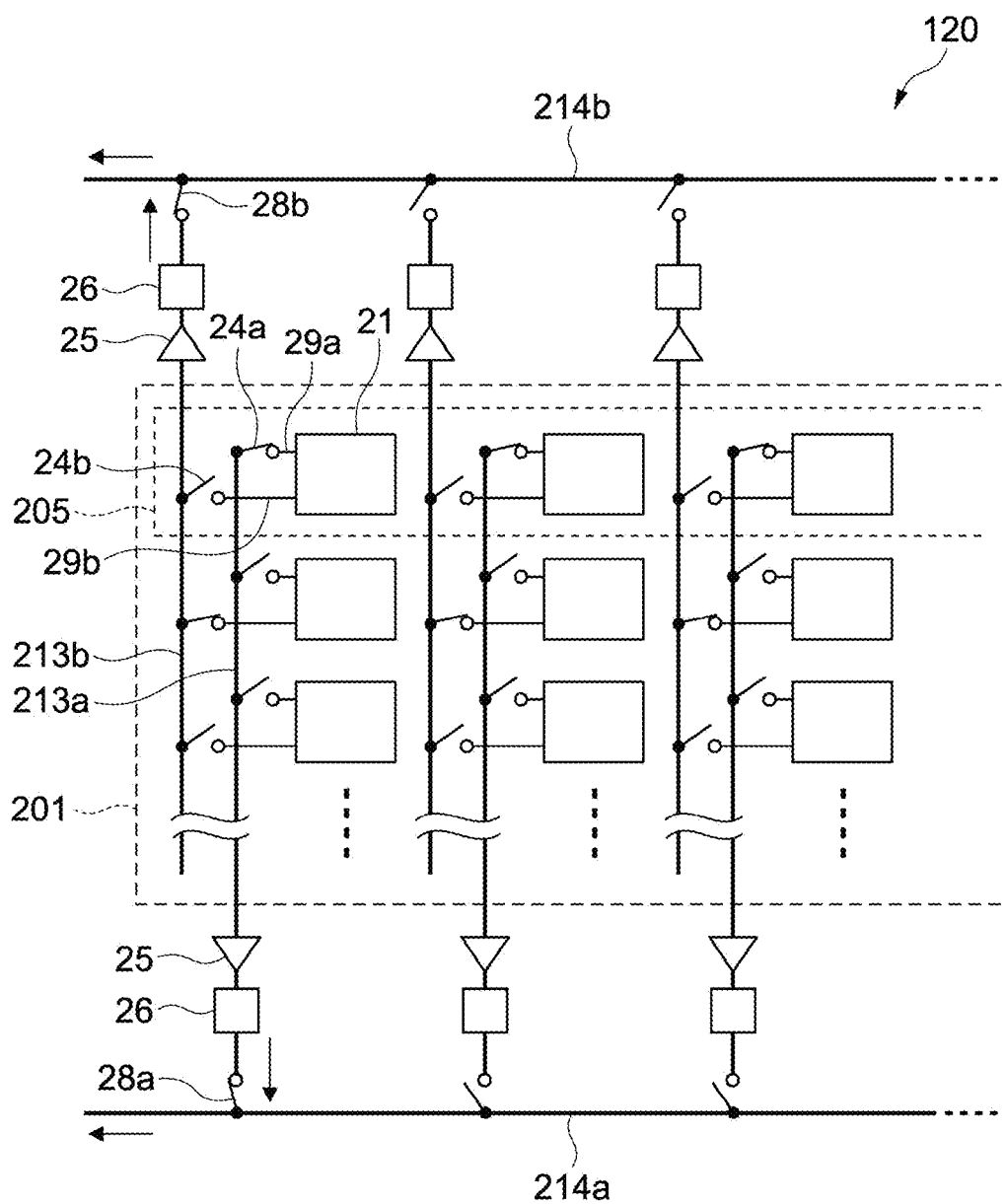
FIG. 11 shows a configuration of a solid state image capturing device according to another configuration example.

FIG. 11 shows a configuration of a solid state image capturing device according to another configuration example. In the solid state image capturing device 20 according to the first embodiment, each pixel line 205 and the output path 36 or 37 are one-to-one in advance. However, in the solid state image capturing device 120 according to this configuration example, each pixel 21 has a plurality of output lines 29a, 29b, which are connectable to the vertical signal lines 213a, 213b by the pixel selection switches 24a, 24b. The vertical signal line 213a is connectable to the horizontal signal line 214a via the column selection switch 28a, and the vertical signal line 213b is connectable to the horizontal signal line 214b via the column selection switch 28b.

By the configuration, the pixel selection switches 24a and 24b are switched, thereby switching the output path of one pixel line 205.

In addition, both of the pixel selection switches 24a, 24b are turned ON, whereby the image signals generated at one pixel line 205 can be output to both output paths at the same time.

As an alternative example of the solid state image capturing device 120 according to this embodiment, three or more vertical signal lines are provided to a pixel group in one column, and the vertical signal lines may be connectable to one pixel by the pixel selection switch. In this case, when two output paths are provided, the greater the number of the vertical signal lines, the greater degree of freedom for selecting the pixel line to output the image signals is.

3. Other Embodiment

The present technology is not limited to the embodiments described above, and other various embodiments can be realized.

The solid state image capturing device 20 may be a CCD (Charge Coupled Device) image sensor. Also in this case, the image capturing apparatus 100 includes a plurality of output path and a plurality of image processing units, thereby realizing the above-described respective embodiments.

In the above-described first to seventh embodiments, the thinning read-out is performed from at least one output path. However, all image signals generated at the pixel line group A, for example, may be read-out from the output path, and may be processed at the first image processing unit 31.

The solid state image capturing device 20 has two output paths, but may have four or more output paths. In this case, the image processing circuit 30 may include four or more image processing units depending on the number of the output paths.

In the solid state image capturing devices according to the above-described embodiments, the selection of the pixel line group is limited by hardware. However, there may be provided a frame buffer that can buffer the image signals generated by the solid state image capturing device in a frame unit. In this case, it can be configured that the control unit accesses the frame buffer, and the pixel lines output from the output paths 36, 37 are freely selected by software processing.

Each component of the image capturing apparatus 100 shown in FIG. 1 may be physically incorporated into at least two separate apparatuses. In this case, the image capturing apparatus configures the image capturing system.

Among the features of the respective embodiments described above, it is possible to combine at least two of them.

The present technology may have the following configurations.

(1) An image capturing control apparatus, including:
 a control unit configured to perform a read-out control of an image capturing unit such that image signals are read out in parallel, the image signals generated under different image capturing conditions for every pixel line group of a plurality of pixel lines of the image capturing unit; and
 a plurality of image processing units configured to process the image signals read out from the image capturing unit.

(2) The image capturing control apparatus according to (1) above, in which
 the control unit is configured to perform a row thinning read-out from each pixel line group, and
 the plurality of image processing units are configured to process the row thinned image read out by the row thinning read-out.

(3) The image capturing control apparatus according to (2) above, in which
 the control unit is configured to perform a read-out control of the image signals from the image capturing unit, the image signals being generated under different exposure conditions for every pixel line group, and
 the plurality of image processing units are configured to perform evaluation processing in AE (Automatic Exposure) processing.

(4) The image capturing control apparatus according to (2) above, in which
 the control unit is configured to perform a read-out control of the image signals from the image capturing unit, the image signals being generated under different exposure conditions for every pixel line group, and
 the plurality of image processing units are configured to perform evaluation processing in AF (Automatic Focus) processing.

(5) The image capturing control apparatus according to (1) above, in which
 the control unit is configured to perform a row thinning read-out from a first pixel line group of the plurality of pixel limes, and read out a partial image unthinned at a partial area of a whole image generated at a second pixel line group different from the first pixel line group, and
 the plurality of image processing units are configured to process the row thinned image read out by the row thinning read-out and the partial image.

(6) The image capturing control apparatus according to (5) above, in which
 the control unit is configured to perform a read-out control of the image signals generated under the different exposure conditions for every pixel line group, and
 the plurality of image processing units are configured to perform the evaluation processing in the AE processing.

(7) The image capturing control apparatus according to (5) above, in which
 the control unit is configured to perform a read-out control of the image signals generated under the different exposure conditions for every pixel line group, and
 the plurality of image processing units are configured to perform the evaluation processing in the AF processing.

(8) The image capturing control apparatus according to (1) above, in which
 the control unit is configured to perform the read-out control such that the image signals are read out at a predetermined read-out cycle, and a parallel read-out timing is shifted by a time shorter than the read-out cycle, and
 the plurality of image processing units are configured to perform the evaluation processing in the AF processing.

(9) The image capturing control apparatus according to any one of (1) to (8) above, in which
 the control unit is configured to read out the image signals in parallel via a plurality of output paths connected to the image processing units.

(10) An image capturing control apparatus, including:
 a control unit configured to read out image signals generated for every pixel line group of a plurality of pixel lines of an image capturing unit at a predetermined read-out cycle, and to perform the read-out control such that a parallel read-out timing is shifted by a time shorter than the read-out cycle; and a plurality of image processing units configured to process the image signals read out from the image capturing unit.

(11) The image capturing control apparatus according to (9) above, in which
the plurality of image processing units are configured to perform evaluation processing in AF (Automatic Focus) processing.

(12) An image capturing apparatus, including:
an image capturing unit including a plurality of pixel lines;
a plurality of output paths configured to be capable of connecting to the image capturing units for every pixel line group of the plurality of pixel lines;
a control unit configured to set different image capturing conditions for every pixel line group, and configured to perform a read-out control of the image capturing unit such that the image signals generated at the pixel line groups under the different image capturing conditions are read out via the plurality of output paths; and
a plurality of image processing units configured to process the image signals read out from the image capturing unit.

(13) An image capturing system, including:
an image capturing unit including a plurality of pixel lines;
a plurality of output paths configured to be capable of connecting to the image capturing units for every pixel line group of the plurality of pixel lines;
a control unit configured to set different image capturing conditions for every pixel line group, and configured to perform a read-out control of the image capturing unit such that the image signals generated at the pixel line groups under the different image capturing conditions are read out via the plurality of output paths; and
a plurality of image processing units configured to process the image signals read out from the image capturing unit.

(14) An image capturing control method, including:
performing a read-out control of an image capturing unit such that image signals are read out in parallel, the image signals generated under different image capturing conditions for every pixel line group of a plurality of pixel lines of the image capturing unit, and
processing the image signals read out from the image capturing unit.

DESCRIPTION OF SYMBOLS 20, 120 the solid state image capturing device
30 image processing circuit
31 first image processing unit
32 second image processing unit
36 first output path
37 second output path
40 the control unit
100 image capturing apparatus
201 pixel array
205 pixel line

The invention claimed is:
1. An image capturing control apparatus, comprising:
a control circuit configured to control read-out of an image sensor such that a plurality of image signals is read out in parallel, wherein
the plurality of image signals is generated under different image capturing conditions for every pixel line group of a plurality of pixel lines of the image sensor,
a first pixel line group comprises a plurality of first pixel lines that alternate with a plurality of second pixels lines of a second pixel line group; and
a plurality of image processing circuits comprising:
a first image processing circuit configured to process the plurality of image signals generated by the plurality of first pixel lines under a first image capturing condition; and
a second image processing circuit configured to process the plurality of image signals generated by the plurality of second pixel lines under a second image capturing condition,
wherein the first image capturing condition is different from the second image capturing condition.

2. The image capturing control apparatus according to claim 1, wherein
the control circuit is configured to execute a row thinning read-out from each of the first pixel line group and the second pixel line group, and
the plurality of image processing circuits is configured to process a row thinned image read out by the row thinning read-out.

3. The image capturing control apparatus according to claim 2, wherein
the control circuit is further configured to control the read-out of the plurality of image signals from the image sensor,
the plurality of image signals is generated under different exposure conditions for the every pixel line group of the plurality of pixel lines, and
the plurality of image processing circuits is further configured to execute an evaluation process in Automatic Exposure (AE) process.

4. The image capturing control apparatus according to claim 2, wherein
the control circuit further configured to control the read-out of the plurality of image signals from the image sensor,
the plurality of image signals is generated under different exposure conditions for the every pixel line group of the plurality of pixel lines, and
the plurality of image processing circuits is further configured to execute an evaluation process in Automatic Focus (AF) process.

5. The image capturing control apparatus according to claim 1, wherein
the control circuit is further configured to:
perform a row thinning read-out from the first pixel line group of the plurality of pixel lines, and
read out a partial image unthinned at a partial area of a whole image generated at the second pixel line group, and
the plurality of image processing circuits is further configured to process a row thinned image read out by the row thinning read-out and the partial image.

6. The image capturing control apparatus according to claim 5, wherein
the control circuit is further configured to control the read-out of the plurality of image signals generated under different exposure conditions for every pixel line group, and
the plurality of image processing circuits is further configured to execute an evaluation process in Automatic Exposure (AE) process.

7. The image capturing control apparatus according to claim 5, wherein the control circuit is further configured to control the read-out of the plurality of image signals generated under different exposure conditions for every pixel line group, and the plurality of image processing circuits is further configured to evaluate processing in Automatic Focus (AF) processing.

8. The image capturing control apparatus according to claim 1, wherein the control circuit is further configured to control the read-out such that the plurality of image signals are read out at a determined read-out cycle, a parallel read-out timing is shifted by a time shorter than the determined read-out cycle, and the plurality of image processing circuits is further configured to execute an evaluation process in Automatic Focus (AF) process.

9. The image capturing control apparatus according to claim 1, wherein the control circuit is further configured to read out the plurality of image signals in parallel via a plurality of output paths connected to the plurality of image processing circuits, a first output path of the plurality of output paths is connected to the plurality of first pixel lines, and a second output path of the plurality of output paths is connected to the plurality of second pixel lines.

10. The image capturing control apparatus according to claim 9, wherein the plurality of image processing circuits is further configured to execute an evaluation process in Automatic Focus (AF) process.

11. The image capturing control apparatus according to claim 1, wherein the plurality of image processing circuits is further configured to:

generate an evaluation value associated with the plurality of image signals;

output the evaluation value to the control circuit, wherein the evaluation value corresponds to a contrast value of the plurality of image signals and a focus position of the plurality of image signals; and process the plurality of image signals based on the evaluation value.

12. An image capturing apparatus, comprising:

an image sensor including a plurality of pixel lines, wherein the image sensor is configured to generate a plurality of image signals;

a plurality of output paths configured to connect the image sensor for every pixel line group of the plurality of pixel lines;

a control circuit configured to:

set different image capturing conditions for each of a plurality of pixel line groups of the plurality of pixel lines; and control read-out of the image sensor such that the plurality of image signals generated at the plurality of pixel line groups under the different image capturing conditions is read out in parallel via the plurality of output paths, wherein the plurality of pixel line groups comprises a first pixel line group and a second pixel line group, and the first pixel line group comprises a plurality of first pixel lines that alternate with a plurality of second pixels lines of the second pixel line group; and a plurality of image processing circuits comprising:

a first image processing circuit configured to process the plurality of image signals generated by the plurality of first pixel lines under a first image capturing condition; and a second image processing circuit configured to process the plurality of image signals generated by the plurality of second pixel lines under a second image capturing condition, wherein the first image capturing condition is different from the second image capturing condition.

13. An image capturing control method, comprising:

controlling, by a control circuit, read-out of an image sensor such that a plurality of image signals is read out in parallel, wherein the plurality of image signals is generated under different image capturing conditions for every pixel line group of a plurality of pixel lines of the image sensor, a first pixel line group comprises a plurality of first pixel lines that alternate with a plurality of second pixels lines of a second pixel line group;

processing, by a first image processing circuit, the plurality of image signals generated by the plurality of first pixel lines under a first image capturing condition; and processing, by a second image processing circuit, the plurality of image signals generated by the plurality of second pixel lines under a second image capturing condition, wherein the first image capturing condition is different from the second image capturing condition.

* * * * *